(12) United States Patent
Hutton

(10) Patent No.: US 8,972,723 B2
(45) Date of Patent: Mar. 3, 2015

(54) STORAGE DEVICE AND METHOD FOR PROVIDING A PARTIALLY-ENCRYPTED CONTENT FILE TO A HOST DEVICE

(75) Inventor: Henry R. Hutton, Tracy, CA (US)

(73) Assignee: SanDisk Technologies Inc., Plano, TX (US)

( * ) Notice: Subject to any disclaimer, the term of this patent is extended or adjusted under 35 U.S.C. 154(b) by 522 days.

(21) Appl. No.: 12/836,049

(22) Filed: Jul. 14, 2010

(65) Prior Publication Data

US 2012/0017084 A1 Jan. 19, 2012

(51) Int. Cl.
| | |
|---|---|
| H04L 29/00 | (2006.01) |
| G06F 21/85 | (2013.01) |
| H04N 21/2347 | (2011.01) |
| G06F 21/10 | (2013.01) |
| G06F 21/78 | (2013.01) |
| H04L 29/06 | (2006.01) |
| H04L 29/08 | (2006.01) |

(52) U.S. Cl.
CPC .......... *G06F 21/85* (2013.01); *H04N 21/23476* (2013.01); *G06F 21/10* (2013.01); *G06F 21/78* (2013.01); *H04L 63/0428* (2013.01); *H04L 67/06* (2013.01); *G06F 2221/2107* (2013.01); *H04L 2463/101* (2013.01)
USPC ............................. 713/165; 713/193; 726/26

(58) Field of Classification Search
CPC ......... G06F 21/10; G06F 21/78; G06F 21/85; G06F 2221/2107; H04L 67/06; H04L 2463/101; H04L 63/0428; H04N 21/23476
USPC ..................................... 713/165, 193; 726/26
See application file for complete search history.

(56) References Cited

U.S. PATENT DOCUMENTS

| | | | |
|---|---|---|---|
| 5,999,622 A | 12/1999 | Yasukawa et al. | |
| 6,598,161 B1 * | 7/2003 | Kluttz et al. | ................... 713/166 |
| 6,976,166 B2 * | 12/2005 | Herley et al. | ................... 713/165 |
| 8,542,823 B1 * | 9/2013 | Nguyen et al. | ................... 380/42 |
| 2003/0231767 A1 * | 12/2003 | Carbajal | ....................... 380/200 |
| 2004/0081333 A1 | 4/2004 | Grab et al. | |

(Continued)

FOREIGN PATENT DOCUMENTS

| | | |
|---|---|---|
| WO | WO 2005/013272 | 2/2005 |
| WO | WO 2006/080754 | 8/2006 |

OTHER PUBLICATIONS

International Search Report and Written Opinion for PCT/US2011/040510 dated Sep. 7, 2011, 10 pages.

*Primary Examiner* — Michael Pyzocha
(74) *Attorney, Agent, or Firm* — Brinks Gilson & Lione

(57) ABSTRACT

A storage device and method for providing a partially-encrypted content file to a host device are provided. In one embodiment, the storage device retrieves a content file from memory in the storage device and partially-encrypts the content file by encrypting some portions of the content file. The storage device sends the partially-encrypted content file to a host device and informs the host device of which portions of the partially-encrypted content file are encrypted. In one embodiment, the remaining portions of the content file are in clear text form and do not need to be decrypted. Because the host device only needs to decrypt the portions of the content file that are encrypted—and not the entire content file—the host device can decrypt the partially-encrypted content file, even if it does not have the processing power to decrypt a fully-encrypted version. In another embodiment, at least some of the remaining portions of the content file are encrypted with at least one additional key.

20 Claims, 4 Drawing Sheets

(56) References Cited

U.S. PATENT DOCUMENTS

| | | | |
|---|---|---|---|
| 2006/0059351 A1* | 3/2006 | Jung et al. | 713/176 |
| 2007/0083467 A1* | 4/2007 | Lindahl et al. | 705/50 |
| 2007/0130071 A1* | 6/2007 | Suzuki | 705/50 |
| 2008/0250251 A1 | 10/2008 | Lin et al. | |
| 2009/0132739 A1 | 5/2009 | Kang | |
| 2009/0146822 A1* | 6/2009 | Soliman | 340/573.1 |
| 2009/0150631 A1 | 6/2009 | Wilsey et al. | |
| 2010/0031060 A1* | 2/2010 | Chew et al. | 713/193 |
| 2010/0287382 A1* | 11/2010 | Gyorffy et al. | 713/185 |
| 2011/0225428 A1* | 9/2011 | Stufflebeam et al. | |

\* cited by examiner

| Sector position in Cluster | Reference Key |
|---|---|
| 1 | A |
| 2 | B |
| 3 | A |
| 4 | A |
| 5 | A |
| 6 | B |
| 7 | C |
| 8 | A |
| 9 | A |
| 10 | A |
| 11 | B |
| 12 | A |
| 13 | A |
| 14 | A |
| 15 | A |
| 16 | A |

Figure 4

STORAGE DEVICE AND METHOD FOR PROVIDING A PARTIALLY-ENCRYPTED CONTENT FILE TO A HOST DEVICE

BACKGROUND

Storage devices, such as Secure Digital (SD) cards, can be used to store content for playback on a host device. To provide copy protection, the content can be stored in an encrypted form in the storage device. In some environments, the storage device decrypts the encrypted content and streams the content in the clear to the host device for concurrent playback. In other environments, the storage device sends the content in an encrypted form to the host device, and the host device decrypts and renders the content at some future time. One difficulty that can be encountered when the storage device sends the content in an encrypted form to the host device is that the processing power of some host devices, such as mobile devices running Java platforms, cannot support the decryption and rendering of some types of encrypted content, especially video. As a result, these host devices are unable to play content stored on a storage device.

SUMMARY

Embodiments of the present invention are defined by the claims, and nothing in this section should be taken as a limitation on those claims.

By way of introduction, the embodiments described below generally relate to a storage device and method for providing a partially-encrypted content file to a host device. In one embodiment, the storage device retrieves a content file from memory in the storage device and partially-encrypts the content file by encrypting some portions of the content file. The storage device sends the partially-encrypted content file to a host device and informs the host device of which portions of the partially-encrypted content file are encrypted. In one embodiment, the remaining portions of the content file are in clear text form and do not need to be decrypted. Because the host device only needs to decrypt the portions of the content file that are encrypted—and not the entire content file—the host device can decrypt the partially-encrypted content file, even if it does not have the processing power to decrypt a fully-encrypted version. In another embodiment, at least some of the remaining portions of the content file are encrypted with at least one additional key. This embodiment can be used to allow limited playback of digital rights management (DRM) protected content, as hosts that are not DRM-aware can access a portion of the content file using one encryption key but would need the at least one additional key from a DRM service to access the other portions.

Other embodiments are provided, and each of the embodiments can be used alone or together in combination. Various embodiments will now be described with reference to the attached drawings.

BRIEF DESCRIPTION OF THE DRAWINGS

FIG. 4 is an illustration showing an exemplary encryption pattern of an embodiment.

DETAILED DESCRIPTION OF THE PRESENTLY PREFERRED EMBODIMENTS

Introduction

The following embodiments provide a storage device and method for providing a partially-encrypted content file. As mentioned in the background section above, while some host devices can decrypt and render an encrypted content file, other host devices, such as mobile devices running Java platforms, may not have the processing power to decrypt and render some types of encrypted content, such as video. The following embodiments provide a solution to this problem. Instead of encrypting the entire content file, the storage device in these embodiments encrypts some portions of the content file. The storage device sends the partially-encrypted content file to the host device and informs the host device which portions of the partially-encrypted content file are encrypted. In one embodiment, the remaining portions of the content file are in clear text form and do not need to be decrypted. Because the host device only needs to decrypt the portions of the content file that are encrypted—and not the entire content file—a host device with limited processing power may be able to decrypt content files that it would otherwise would not. This allows a larger range of mobile handsets (perhaps 50% more) to access copy-protected content stored on storage devices. Further, even though portions of the partially-encrypted content file are transmitted in the clear and, thus, can be intercepted by a hacker, these clear portions will not be useful without the missing encrypted portions. Accordingly, these embodiments still allow for the secure transfer of copy-protected content files.

In another embodiment, instead of all of the remaining portions of the content file being left in clear text form, at least some of the remaining portions of the content file are encrypted with at least one additional key. This embodiment can be used to allow limited playback of digital rights management (DRM) protected content, as hosts that are not DRM-aware can access a portion of the content file using one encryption key but would need the at least one additional key from a DRM service to access the other portions.

Before turning to a discussion of partially encrypting a content file, the following section provides a discussion of an exemplary host device and storage device.

Exemplary Host Device and Storage Device

Figure 1:
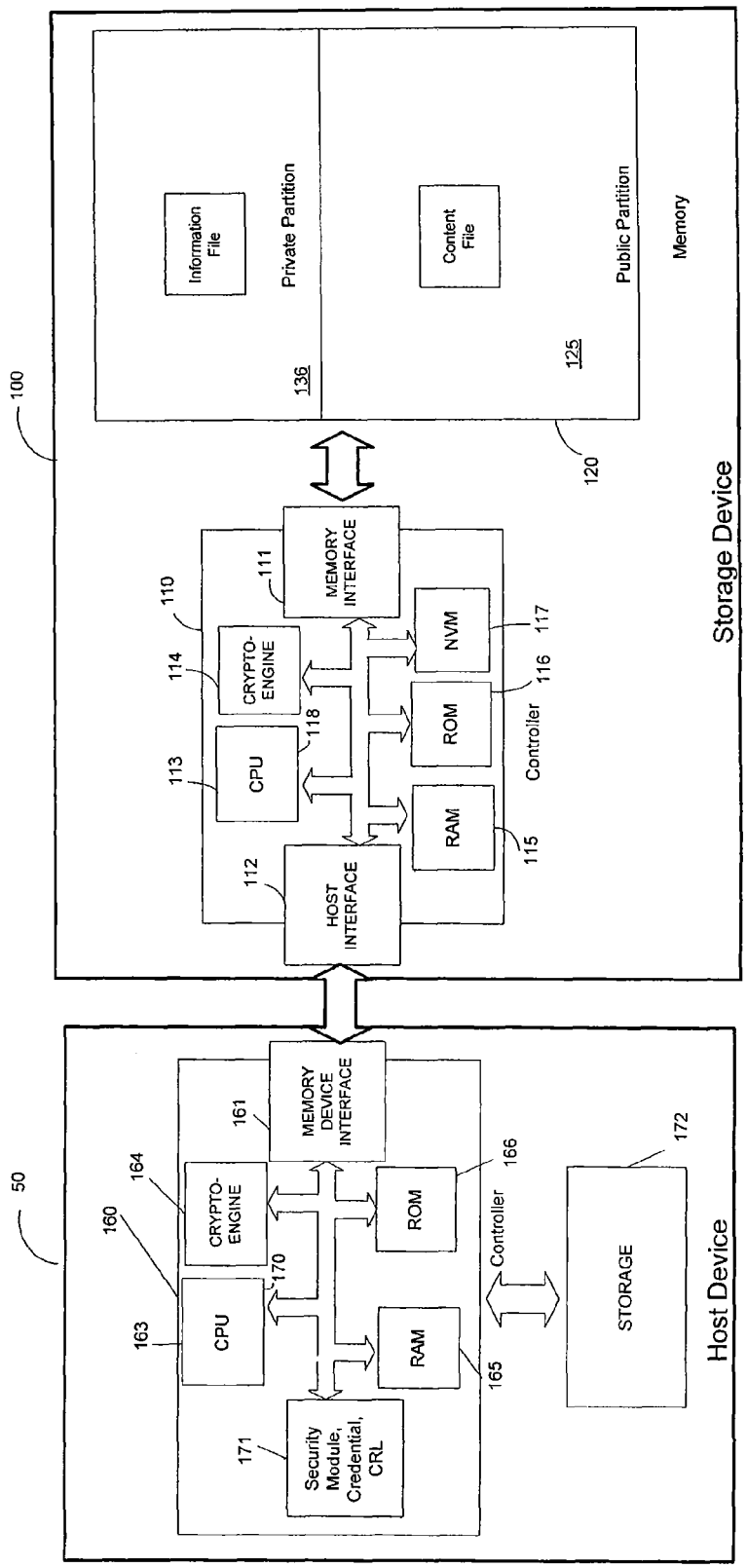
FIG. 1 is a block diagram of a host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. The host device 50 can take any suitable form, such as, but not limited to, a personal computer (PC), a mobile phone, a digital media player, a game device, a personal digital assistant (PDA), a kiosk, a set-top box, a TV system, a book reader, or any combination thereof. In this embodiment, the storage device 100 is a mass storage device that can take any suitable form, such as, but not limited to, a handheld, removable memory card, a universal serial bus (USB) device, a removable or non-removable hard drive, such as a solid-state drive, and an embedded memory (e.g., a secure module embedded in the host device 50).

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, a hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/decryption operations. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers ARC 625D, Atmel AT91SAM, Microchip PIC18F26K20, and Silicon Labs C8051F320.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In this embodiment, the memory 120 comprises a public partition 125 that is managed by a file system on the host 50 and a private partition 135 that is internally managed by the controller 110. The private partition 135 can store the state 142 of the storage device 100 (as will be described below), as well as other data, including, but not limited to, content encryption keys (CEKs) and firmware (FW) code. The public partition 125 and the private partition 135 can be part of the same memory unit or can be different memory units. Preferably, the storage device 200 takes the form of a TrustedFlash™ storage device by SanDisk Corporation.

Turning now to the host 50, the host 50 comprises a controller 160 that has a storage device interface 161 for interfacing with the storage device 100. The controller 160 also comprises a central processing unit (CPU) 163, a crypto-engine 164 operative to provide encryption and/or decryption operations, read access memory (RAM) 165, read only memory (ROM) 166, a security module 171, and storage 172. The storage device 100 and the host 150 communicate with each other via a storage device interface 161 and a host interface 112. For operations that involve the secure transfer of data, it is preferred that the crypto-engines 114, 164 in the storage device 100 and host 150 be used to mutually authenticate each other and provide a key exchange. After mutual authentication is complete, it is preferred that a session key be used to establish a secure channel for communication between the storage device 150 and host 100. The host 50 can contain other components (e.g., a display device, a speaker, a headphone jack, a video output connection, etc.), which are not shown in FIG. 1 to simplify the drawings.

As mentioned above, the host device 50 and storage device 100 are configured to perform mutual authentication of each other. In one embodiment, the mutual authentication process comprises three phases: a public key verification phase, a private key verification phase, and a session key agreement phase. During the public key verification phase, the host device 50 and the storage device 100 each sends the other its certificate chain, so that the other can verify the genuineness of the certificate and of the public key using a root certificate authority public key located in a root certificate. Where an intermediate certificate authority between the root certificate authority and the host device 50 or storage device 100 is involved, the intermediate certificate is used as well for the verification.

If the public key verification phase is successful, the private key verification phase is performed. During the private key verification phase, the host device 50 and the storage device 100 each generates a random number and sends it as a challenge to the other device. With respect to the storage device 100, the storage device 100 signs the host device's random number using the private key of the host device 50 and sends the signed random number as the response to the challenge. The response is decrypted using the host device's public key and compared with the random number. If the decrypted response matches the random number, then the challenge response is successful. The same process occurs with respect to the host device 50.

If the private key verification phase is successful, the session key agreement phase is performed. During the session key agreement phase, the random number is encrypted using the host device's public key. This random number is then the session key. The host device 50 can obtain the session key by using its private key to decrypt the encrypted number from the storage device 100. The same process occurs on the host device 50 side. With the session key, secure communication between the host device 50 and the storage device 100 can be initiated. It should be noted that other forms of authentication can be used, such as, but not limited to, single-side RSA and authentication using shared secrets.

Embodiments Related to Partially Encrypting a Content File

Figure 2:
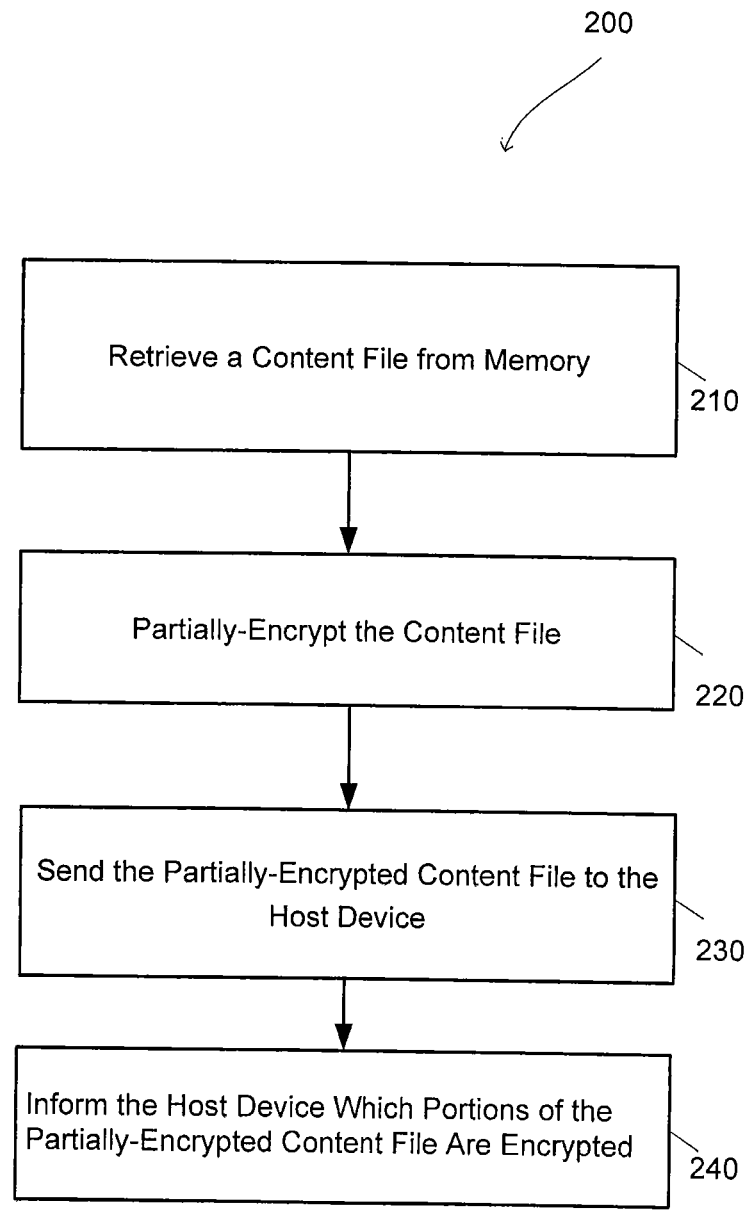
FIG. 2 is a flow chart of a method of an embodiment for providing a partially-encrypted content file to a host device.

As mentioned in the background section above, while some host devices can decrypt and render an encrypted content file, other host devices, such as mobile devices running Java platforms, may not have the processing power to decrypt and render some types of encrypted content, such as video. To address this problem, the method shown in the flow chart 200 of FIG. 2 can be implemented in the storage device 100. As shown in FIG. 2, the storage device 100 retrieves a content file from the memory 120 (act 210) and partially-encrypts the content file by encrypting some portions of the content file (act 220). In this embodiment, the remaining portions of the content file are left in clear text form. The storage device 100 then sends the partially-encrypted content file to the host device 50 (act 230). At some point before, after, or during the transmission of the partially-encrypted content file to the host device 50, the storage device 100 informs the host device 50 of which portions of the partially-encrypted content file are encrypted (act 240). Because the host device 50 only needs to decrypt the portions of the content file that are encrypted—and not the entire content file, because the remaining portions of the content file are left in clear text form in this embodiment—the host device 50 may be able to decrypt the content file even if it has limited processing power. (The number of portions of the content file that are encrypted is preferably less than a maximum number of portions that the host device 50 is operative to decrypt.) Accordingly, a storage device, such as a storage delivery card (SDC), implementing this method can allow a larger range of mobile handsets to access its stored content file.

Any suitable technique can be used to implement these embodiments. One technique takes advantage of the file system structures in a file allocation table (FAT) file system. On a storage device that operates under a FAT file system, content files stored in the storage device are managed as groups of clusters, where a cluster is a group of sectors. Applications on a host device typically reference data within a file by an offset, and the file system translates this offset to specific addressable sectors. By using knowledge of FAT file system cluster size, a storage device can encrypt only portions of clusters and inform a host device as to which sectors of a content file are encrypted and which are in clear text. In one embodiment, the storage device 100 randomly generates a localized encryption key and randomly selects the sectors within a cluster that will be encrypted (preferably, up to a maximum number set to allow host devices with limited computing power to be able to decrypt the content file). The maximum number can be predetermined, so the storage device 100 would not need to have knowledge of the processing capabilities and limitations of a particular host device. Alternatively, the storage device 100 can be operative to choose the maximum number of portions to encrypt on the fly. For example, the storage device 100 can store a table or some other data structure detailing the maximum number of portions to encrypt based on host device identifiers. After the storage device 100 receives the host device identifier from the host device (e.g., through authentication), the storage device 100 can index the stored information with the received host device identifier to find the maximum number of portions to encrypt for that particular host device.

Irrespective of whether the maximum number of encrypted portions is predetermined or determined by the storage device 100, the encryption can be performed on a cluster-by-cluster basis, so that different sectors are encrypted in different clusters at the time the data is transferred to the host device 50. Further, the sectors in a given cluster that are encrypted and sent to the host device 50 can be varied each time the cluster is read to make it more difficult for a hacker to predict which sectors are encrypted in a given cluster. So, the encryption can be static (e.g., the same sectors in a given cluster are encrypted every time the cluster is read) or dynamic (e.g., different sectors in a given cluster are encrypted every time the cluster is read). In either static or dynamic encryption, the information as to what clusters are encrypted are transferred to the host device 50 (preferably, after trust is established between the storage device 100 and the host device 50), so that the host device 50 knows which clusters are encrypted for that particular session. Preferably, the storage device 100 is formatted with a minimum cluster size of 16 Kbytes (although other sizes can be used), and content preferably starts at the beginning of a cluster.

In one embodiment, the sectors in a cluster that are to be encrypted are set at the manufacturing of the storage device (i.e., at "image creation"). In this embodiment, at the point of image creation, clusters within the image are identified in such a manner that the storage device 100 can apply a random or pseudo-random encryption pattern on selected clusters. An information file can be produced that includes a reference identifier (ID) to randomly generate an encryption key and to select a random pattern that can be used to select which sectors of a given cluster are encrypted by the generated encryption key to create the partially-encrypted content file. The information file can contain a table of various encryption keys and encryption patterns, both associated with respective Reference IDs, which can be based on the session ID established between the host device 50 and the storage device 100 during mutual authentication. The information file is preferably stored in the private partition 136 of the memory 120 to prevent tampering with and unauthorized access to the information file. As an alternative to using an information file, the encryption pattern and key can be stored in a header of the content file or some other location.

Figure 3:
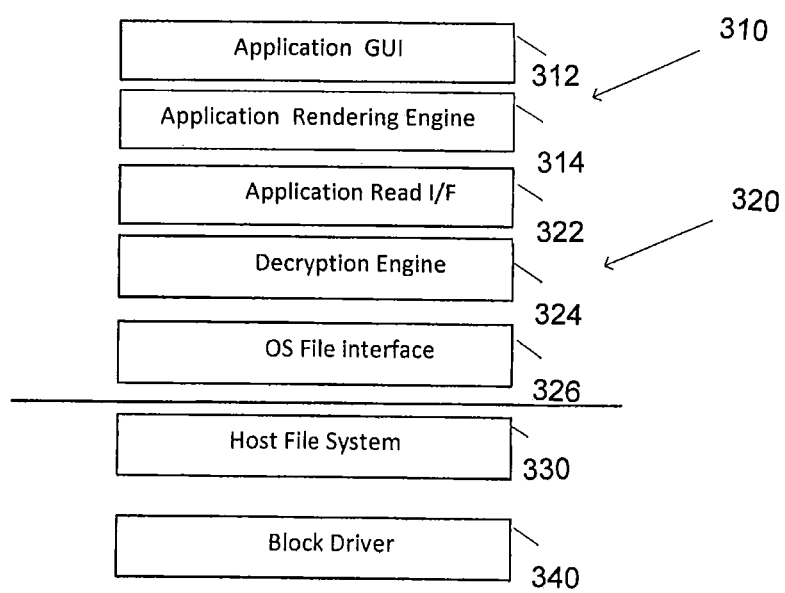
FIG. 3 is a block diagram showing how communication is performed between a host device and storage device of an embodiment.

Returning to the drawings, FIG. 3 is a block diagram of showing how communication is performed between the host device 50 and the storage device 100. As shown in FIG. 3, the host device 50 can implement a file interface module 320 that communicates with an application 310 (e.g., a media player) and the host device's file system 330. The application 310 generally comprises a graphical user interface (GUI) for a user to select a desired content file and an application rendering engine for rendering the content file (e.g., playing a song, playing a movie, etc.). The file interface module 320 comprises an application read interface 322 that receives commands from the application 310, a decryption engine that decrypts an incoming content file according to the encryption pattern, and an operating system file interface 326 for communicating with the host device's file system 330. The host device 50 also implements a storage device block driver 340 for communicating with the storage device 100. Preferably, the application 310 and the file interface module 320 are compiled in such a way that the transfer of content between the file interface module 320 and the application 310 is done securely. In one embodiment, the file interface module 320 is implemented as a software module running on the host device's controller 160 to avoid the need to change the host device's firmware.

In operation, the application 310 calls the file interface module 320, and the file interface module 320 performs File Open, File Read, and File Write operations requested by the application 310. The storage device 100 uses the Reference ID to index the information file stored in the storage device 100 to find the appropriate encryption key and encryption pattern to partially encrypt the content file. The storage device 100 sends the partially-encrypted content file to the host device 100 along with the information file, so the host device 50 can find the encryption key and encryption pattern based on the Reference ID. Alternatively, the storage device 100 can simply send the encryption key and encryption pattern to the host device 100. In either situation, the file interface module 320 decrypts the relevant portions of the content file and passes it onto the application 310, where the application rendering engine 314 renders the content file.

In summary, in this example, the storage device 100 encrypts portions of a content file by encrypting a fixed number of sectors in each cluster of the content file according to an encryption pattern and an encryption key referenced by an Reference ID, which can be based on a session key created during the mutual authentication process. The storage device 100 sends the partially-encrypted content file to the host device 50 along with the information file, so the host device 50 will be able to identify the encryption key and pattern and decrypt the encrypted portions of the content file. The host device 50 can implement a file interface module to intercept read and write commands from an application, securely retrieve an encryption key referenced in the information file, and determine which portions of the partially-encrypted content file need to be decrypted. As noted above, because the host device 50 only needs to decrypt the portions of the content file that are encrypted—and not the entire content file—the host device 50 can decrypt the content file, even if it does not have the processing power to decrypt a fully-encrypted version. This also provides an increased value to the storage device 100 since the content is localized to the storage device 100 and the securely-stored encryption key is unique to each storage device.

In the above examples, the encryption pattern used to partially-encrypt a content file was stored in the storage device 100 during manufacturing. In another embodiment, the host device 50 and storage device 100 are configured to dynamically generate the encryption/decryption pattern. In this embodiment, both the host device 50 and the storage device 100 have pseudo-random number generators. During the authentication process, a random seed value is created by the storage device 100 and securely sent to the host device 50. The host device 50 sends a random count value to the storage device 100 that is used by the storage device's pseudo-random number generator to create a "random" value. (Alternatively, the storage device 100 can also send a random count value to the host device 50.) The storage device 100 then sends a pattern that indicates which portions of the content file will encrypted and with which reference key. FIG. 4 shows an exemplary pattern where encryption is to be performed on various sectors in a cluster. The various reference keys are shown as A, B, and C in FIG. 4. It should be noted that one of these keys can be a null key, in which case that portion of the content file are to be transmitted in plain text from the storage device 100.

The value for the reference keys is preferably exchanged in a secure communication channel between the application running in the host device 50 and the storage device 100. In the event that the random number generates a pattern that does not meet a predetermined distribution, a new value can be generated. The storage device 100 can be configured to generate either a random count value or simply move to the next pseudo random number. For example, a preset condition can be that five is the minimum number of encrypted sectors, that five is the maximum number of sectors transmitted in the clear, and that at least three sectors must be sent as ciphered text.

There are many alternatives that can be used with these embodiments. For example, in the above embodiments, some portions of the content file were encrypted, and other remaining portions were left in the clear text form. In another embodiment, instead of all of the remaining portions of the content file being left in clear text form, at least some of the remaining portions of the content file are encrypted with at least one additional key. For example, consider the situation in which two encryption keys are used to encrypt a content file. (Although two encryption keys are being used in this example, it should be understood that more than two encryption keys can be used.) As with the embodiment discussed above, some portions of the content file would be encrypted using the first encryption key. However, instead of leaving all of the remaining portions in clear text form, at least some of the remaining portions would be encrypted using the second key. By encrypting different portions with different encryption keys, this embodiment can be used to allow limited playback of digital rights management (DRM) protected content. Specifically, hosts that are not DRM-aware can access a portion of the content file using one encryption key (e.g., from a general playback account on the storage device) but would need the at least one additional key from a DRM service (e.g., from a DRM service account on the storage device) to access the other portions.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for providing a partially-encrypted content file to a host device, the method comprising:

performing the following in a storage device having a memory storing a content file and further storing an information file specifying a plurality of encryption patterns and encryption keys:

authenticating the host device in communication with the storage device, wherein the authenticating establishes a session key;

choosing an encryption pattern and an encryption key from the information file based on the session key;

retrieving the content file from the memory;

partially-encrypting the content file by encrypting a number of portions of the content file using the chosen encryption pattern and encryption key, wherein the number of portions of the content file that are encrypted is less than a maximum number of portions of the content file that the host device is operative to decrypt;

sending the partially-encrypted content file to the host device; and updating the host device with information that indicates which portions of the partially-encrypted content file are encrypted by sending the information file to the host device.

2. The method of claim 1, wherein the maximum number of portions is predetermined.

3. The method of claim 1, wherein the maximum number of portions is determined by the storage device based on a host device identifier.

4. The method of claim 1, wherein the content file comprises a plurality of clusters, each cluster comprising a respective plurality of sectors, and wherein the partially-encrypted content file is created by encrypting some but not all of the sectors in each of the plurality of clusters.

5. The method of claim 1, wherein the information file is stored in a private partition of the memory.

6. The method of claim 1, wherein the content file is partially-encrypted using a static encryption pattern.

7. The method of claim 1, wherein the content file is partially-encrypted using a dynamically-generated encryption pattern.

8. The method of claim 7, wherein the dynamically-generated encryption pattern is generated from a random value generated by the storage device and a random value received from the host device.

9. The method of claim 1 further comprising encrypting at least some remaining portions of the content file with at least one additional encryption key.

10. The method of claim 9, wherein the at least one additional encryption key is associated with a digital rights management (DRM) service.

11. A storage device comprising:

an interface configured to communicate with a host device;

a memory storing a content file and further storing an information file specifying a plurality of encryption patterns and encryption keys; and a controller in communication with the interface and the memory, wherein the controller is configured to:

authenticate the host device, wherein authenticating establishes a session key;

choose an encryption pattern and an encryption key from the information file based on the session key;

retrieve a content file from the memory;

partially-encrypt the content file by encrypting a number of portions of the content file using the chosen encryption pattern and encryption key, wherein the number of portions of the content file that are encrypted is less than a maximum number of portions of the content file that the host device is operative to decrypt;

send the partially-encrypted content file to the host device; and update the host device with information that indicates which portions of the partially-encrypted content file are encrypted by sending the information file to the host device.

12. The storage device of claim 11, wherein the maximum number of portions is predetermined.

13. The storage device of claim 11, wherein the maximum number of portions is determined by the storage device based on a host device identifier.

14. The storage device of claim 11, wherein the content file comprises a plurality of clusters, each cluster comprising a respective plurality of sectors, and wherein the partially-encrypted content file is created by encrypting some but not all of the sectors in each of the plurality of clusters.

15. The storage device of claim 11, wherein the information file is stored in a private partition of the memory.

16. The storage device of claim 11, wherein the content file is partially-encrypted using a static encryption pattern.

17. The storage device of claim 11, wherein the content file is partially-encrypted using a dynamically-generated encryption pattern.

18. The storage device of claim 17, wherein the dynamically-generated encryption pattern is generated from a random value generated by the storage device and a random value received from the host device.

19. The storage device of claim 11, wherein at least some remaining portions of the content file are encrypted with at least one additional encryption key.

20. The storage device of claim 19, wherein the at least one additional encryption key is associated with a digital rights management (DRM) service.

* * * * *